United States Patent
Marciniak et al.

(10) Patent No.: US 9,920,890 B2
(45) Date of Patent: Mar. 20, 2018

(54) SOURCE OF BROADBAND WHITE LIGHT GENERATED ON OXIDE MATRICES HIGHLY DOPED WITH RARE EARTH IONS, EXCITED BY INFRARED RADIATION

(71) Applicant: INSTYTUT NISKICH TEMPERATUR I BADAŃ STRUKTURALNYCH PAN IM, Wroclaw (PL)

(72) Inventors: Lukasz Marciniak, Wroclaw (PL); Dariusz Hreniak Hreniak, Wroclaw (PL); Artur Bednarkiewicz, Wroclaw (PL); Wieslaw Strek, Bielany Wroclawskie (PL)

(73) Assignee: INSTYTUT NISKICH TEMPERATUR I BADAN STRUKTURALNYCH PAN IM, Wroclaw (PL)

( * ) Notice: Subject to any disclaimer, the term of this patent is extended or adjusted under 35 U.S.C. 154(b) by 0 days.

(21) Appl. No.: 15/312,105

(22) PCT Filed: May 15, 2015

(86) PCT No.: PCT/PL2015/000080
§ 371 (c)(1),
(2) Date: Nov. 17, 2016

(87) PCT Pub. No.: WO2015/178785
PCT Pub. Date: Nov. 26, 2015

(65) Prior Publication Data
US 2017/0089526 A1 Mar. 30, 2017

(30) Foreign Application Priority Data
May 21, 2014 (PL) .......................... 408282

(51) Int. Cl.
*F21V 9/16* (2006.01)
*F21K 9/64* (2016.01)
(Continued)

(52) U.S. Cl.
CPC ............ *F21K 9/64* (2016.08); *C09K 11/7705* (2013.01); *C09K 11/7709* (2013.01);
(Continued)

(58) Field of Classification Search
CPC ... F21K 9/54; F21K 9/69; F21K 2/005; C09K 11/7705; C09K 11/7709; C09K 11/7756;
(Continued)

(56) References Cited

U.S. PATENT DOCUMENTS 7,088,040 B1 8/2006 Ducharme et al.
2005/0253113 A1 11/2005 Letz et al.
(Continued)

FOREIGN PATENT DOCUMENTS

EP 1475380 A1 11/2004

OTHER PUBLICATIONS

International Search Report for App. No. PCT/PL2015/000080 dated Sep. 1, 2015.
(Continued)

*Primary Examiner* — Thomas M Sember
(74) *Attorney, Agent, or Firm* — Walker & Jocke; Ralph E. Jocke

(57) ABSTRACT

An exemplary embodiment provides for a source of white light having at least one white light emitting device composed of a transparent glass/quartz chamber, a vacuum chamber including an optically active element, a spacer, a focusing lens, an IR laser diode, where the optically active element arranged in the vacuum chamber is a thin-layer oxide matrix doped with rare earth ions selected from the
(Continued)

group of Nd, Yb, the concentration of dopant ions being in the range of 0.0001 to 100 at %.

17 Claims, 3 Drawing Sheets

(51) Int. Cl.
| | |
|---|---|
| *C09K 11/77* | (2006.01) |
| *F21K 2/00* | (2006.01) |
| *F21K 9/69* | (2016.01) |
| *F21V 5/04* | (2006.01) |
| *F21V 3/04* | (2018.01) |
| *F21V 9/04* | (2018.01) |
| *F21Y 115/30* | (2016.01) |

(52) U.S. Cl.
CPC ...... *C09K 11/7756* (2013.01); *C09K 11/7773* (2013.01); *F21K 2/005* (2013.01); *F21K 9/69* (2016.08); *F21V 3/0418* (2013.01); *F21V 5/04* (2013.01); *F21V 9/04* (2013.01); *F21V 9/16* (2013.01); *F21Y 2115/30* (2016.08)

(58) Field of Classification Search
CPC ......... C09K 11/7773; F21V 5/04; F21V 9/04; F21V 9/16; F21V 3/0418
See application file for complete search history.

(56) References Cited

U.S. PATENT DOCUMENTS

2011/0309303 A1    12/2011  Vogt
2012/0064134 A1     3/2012  Bourke, Jr. et al.

OTHER PUBLICATIONS

Jiwei Wang et al: "Luminous and tunable white-light upconversion for YAG Yb 3 Al 5 O 12 and Yb; Y 2 O 3 nanopowders", Optical Society of America OCIS, Oct. 28, 2010 (Oct. 28, 2010), pp. 6810, XP055208352.

Jiwei Wang et al: "Upconversion for White Light Generation by a Single Compound", Journal of the American Chemical Society, vol. 132, No. 3, Jan. 27, 2010 (Jan. 27, 2010), pp. 947-949, XP055208351, ISSN: 0002-7863, DOI: 10.10211ja909254u.

Marciniak L et al: "Upconversion emission of LiNdP4O12and KNdP4O12crystals", Journal of Luminescence, vol. 133, Dec. 9, 2011 (Dec. 9, 2011), pp. 57-60, XP028957789, ISSN: 0022-2313, DOI: 10.1016/J.JLUMIN2011.11.035.

Strek W et al: "Infrared laser stimulated broadband white emission of Yb3+:YAG nanoceramics", Optical Materials, vol. 35, No. 11, Feb. 16, 2013 (Feb. 16, 2013), pp. 2013-2017, XP028699693, ISSN: 0925-3467, DOI: 10.1016/J.OPTMAT.2012.09.037.

SOURCE OF BROADBAND WHITE LIGHT GENERATED ON OXIDE MATRICES HIGHLY DOPED WITH RARE EARTH IONS, EXCITED BY INFRARED RADIATION

BACKGROUND

In the prior art, there are several methods of obtaining white light by processes different from the phenomenon of black body radiation, i.e. incandescence. Methods based on the use of organic phosphors excited in the ultraviolet range (UV) and based on inorganic phosphors doped with transition metal ions or rare earth metal ions dominate among them.

European Patent Application EP 1 475 380 A1 discloses the use of organic compounds for generating white light, on the basis of the phenomenon of electroluminescence. The disadvantage of this solution is the lack of stability of light emission of a particular colour and gradual change of light colour towards yellow, and high wear of OLEDs, which makes the solution according to this invention not meet the expectations put upon modern lighting.

US Patent Application US 2005/0253113 A1 discloses the use of glasses doped with ions of lanthanides excited in the UV range to the range of blue light for obtaining white luminescence constituted of a plurality of narrow spectral lines occurring in the blue, green and red range of the electromagnetic spectrum. The colour of the such obtained light makes only impression of white light—the light is generally considered as "cold" and unfriendly in perception.

US Patent Application No US 2011/0309303 A1 discloses the use of oxyfluoride matrices co-doped with lanthanide ions for generating white light using optical pumping with infrared radiation. Emission of white light by means of matrices according to this invention uses the phenomenon of up-conversion through a combination of spectrally narrow emission lines characteristic for f-f transitions of lanthanide ions.

However, U.S. Pat. No. 7,088,040 B1 discloses the use of the phenomenon of up-conversion in matrices made of $NaYF_4$ doped with Er and Yb, of $YLiF_4$ doped with Tm and Yb, of $YF_3$ doped with Tm and Yb, and of $YF_3$ doped with Er and Yb ions. The radiation in this invention is absorbed by one of the dopant ions—the so called sensitizer (here Yb ions), and the radiation characteristic of the emitting lanthanide ions (the so called activator, here Er and Tm ions) on the third degree of oxidation is obtained by multiphoton processes, while this radiation is characterised by narrow spectral emission lines.

SUMMARY

An exemplary embodiment provides for a source of broadband white light generated on oxide matrices highly doped with rare earth ions metals and excited by infrared radiation.

There are some methods suitable to obtain white light with rare earth doped phosphors. These phosphors are excited by high-energy electromagnetic radiation typically from the range of ultraviolet, violet and blue light as a source of optical pumping, and emission in the range of visible radiation is obtained.

There are also some other methods of producing white light in materials doped with rare earth ions known, which exploit photo excitation with infrared laser diodes, through the phenomenon of conversion of radiant energy upwards, known as up-conversion—UPC. The method of obtaining white light is based on obtaining quasi-white light by a combination of discrete and narrow band emission from the blue, green and red spectral range, in appropriate quantitative ratios. The light generated by this type of source is characterised by a low colour rendering index due to the presence of narrow bands in the emission spectrum of these materials.

DETAILED DESCRIPTION

Figure 1:
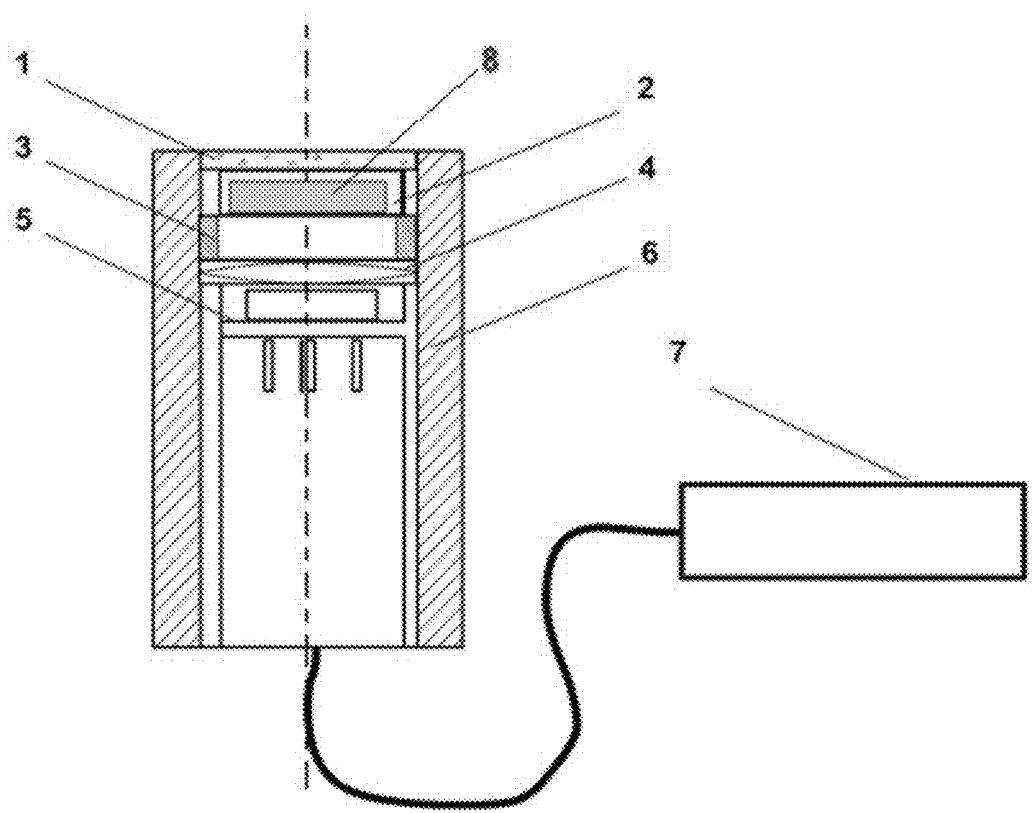
FIG. 1 shows a schematic drawing of a device generating white light in vertical section view.

An exemplary embodiment provides for a source of white light, with a broad spectrum of radiation in the range of visible light and with a stable colour throughout the lifetime of the source, and with a colour rendering index which will not result in distortions in the perception of colours and in eye fatigue of the person working in the lighting using this type of light source.

An exemplary embodiment provides the source of the white light comprises at least one white light emitting device composed of a body including a transparent glass/quartz chamber portion, a vacuum chamber comprising an optically active element, a spacer, a focusing lens, an IR laser diode and a power supply unit, and is further characterised in that the optically active element arranged in the vacuum chamber is a thin-layer oxide matrix doped with rare earth ions selected from the group of Nd or Yb ions, the concentration of dopant ions being in the range of 0.0001 to 100 at % (atomic %).

An exemplary embodiment provides that the optically active element is a thin-layer matrix selected from the group consisting of $Ca_9Nd(OH)_2$, $Ca_9Yb(OH)_2$, $NaNdP_4O_{12}$, $RbNdP_4O_{12}$, $RbYbP_4O_{12}$.

An exemplary embodiment provides that the optically active element is a thin-layer oxide matrix in the form of nanocrystalline or microcrystalline powder, glass, crystal, nanoceramics, nanocomposite, the thickness of the layer being not higher than 10 mm.

An exemplary embodiment provides that the optically active element, after excitation with a radiation beam generated by the IR laser diode, emits white light with a colour rendering index, CRI, above 90. The high colour rendering index obtained for the source of white light does not introduce distortions in the perception of colours and does not cause eye fatigue of the person working in the lighting using this type of light source. Therefore, the colour rendering index obtained for the source of white light according to the exemplary embodiment is close to 100.

An exemplary embodiment provides that the IR laser diode emits radiation in the near infrared range having a wavelength of 800-1200 nm.

In an exemplary embodiment, when the optically active element is doped with a single type of optically active ion, e.g. $Nd^{3+}$ or $Yb^{3+}$, excitation wavelength generated by the IR laser diode is respectively approx. 808 nm for the matrix doped with $Yb^{3+}$ ions, and approx. 940-980 nm for the matrix doped with $Nd^{3+}$ ions.

In an exemplary embodiment, the optically active element absorbs radiation from the near infrared range, which allows generating the broadband radiation, covering almost the entire range of visible electromagnetic radiation.

In an exemplary embodiment, the pressure value in the vacuum chamber, in which the optically active element is located, is in the range of $10^3$-$10^{-6}$ mbar. In a further exemplary embodiment, the pressure value is $10^{-3}$ mbar.

In an exemplary embodiment, the intensity of visible light emission is adjusted with the power of optical pumping or with the pressure of surrounding gases.

Due to the fact that the intensity of light emission is strongly dependent on density of optical pumping, it is possible to modulate the emission intensity by varying the distance between the lens and the optically active element. The closer this distance is to the focal length value, the higher intensity of light emission that is obtained.

Further, the intensity of white light emission in an exemplary embodiment is inversely proportional to the pressure of gases surrounding the optically active element, therefore the intensity of white light emission can be also controlled by adjusting the pressure of gases surrounding the optically active element within the vacuum chamber. The gases surrounding the optically active element within the vacuum chamber are non-reactive.

The source of white light in an exemplary embodiment obtains an electro optical efficiency of approx. 10%.

Figure 2:
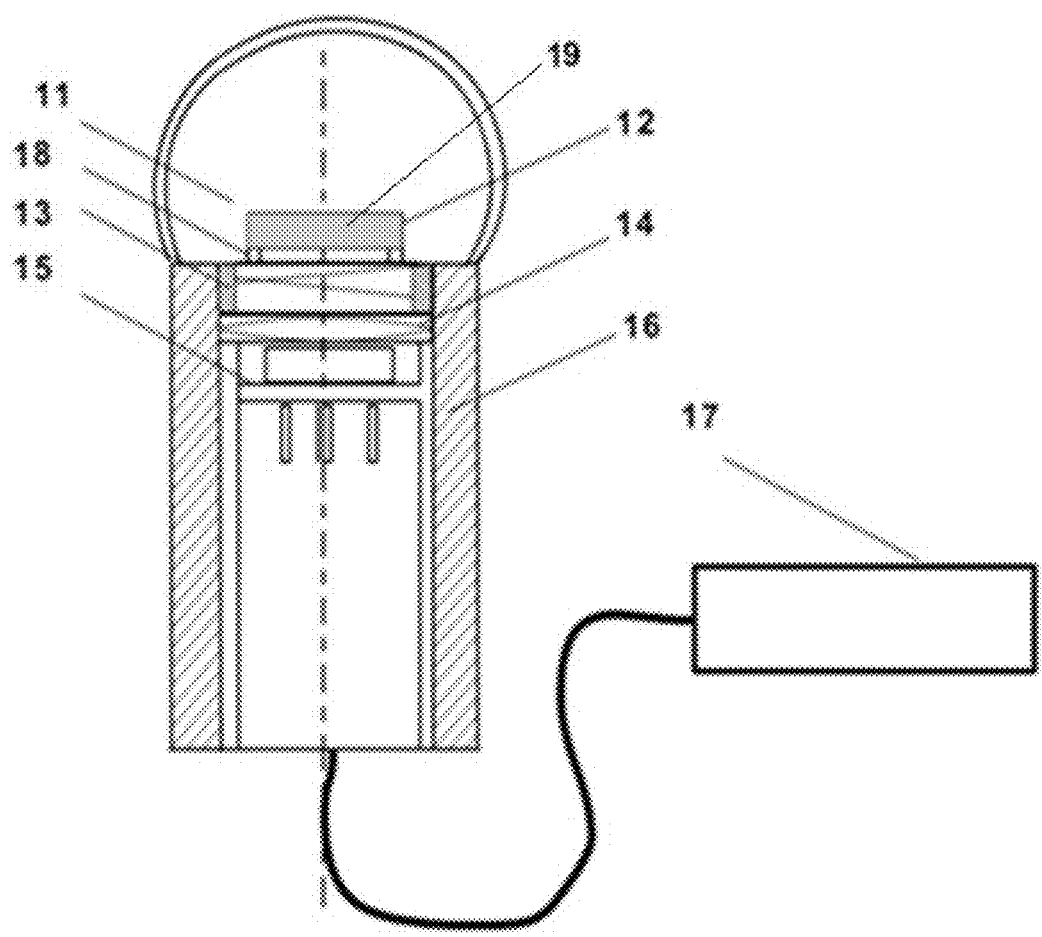
FIG. 2 shows a schematic drawing of a device generating white light in vertical section view with a pedestal.
Figure 3:
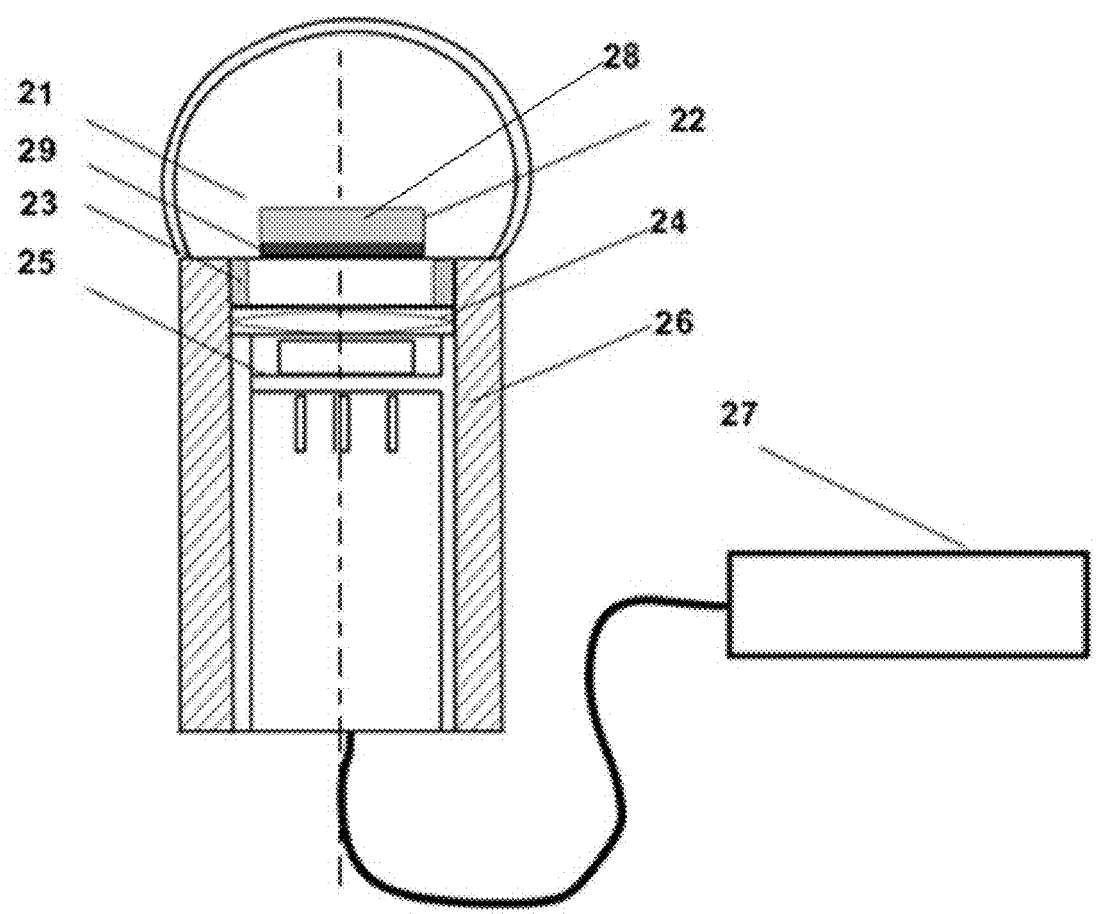
FIG. 3 shows schematic drawing of a device generating white light in vertical section view with a mirror.

Exemplary embodiments are illustrated in the schematic drawing in which FIG. 1, FIG. 2 and FIG. 3 show the device generating white light in a vertical section view.

The device shown in FIG. 1 is composed of a body which includes a chamber 6 closed at the top with a transparent portion including a flat frontal area 1 within which further elements are placed, where moving inward from the front side 1 of the chamber 6, first, there is a vacuum chamber 2 comprising an optically active element 8, and then a spacer 3, which spacer separates the optically active element and a focusing lens by a distance, the focusing lens 4, an IR diode 5 connected to a laser diode electrical power supply unit 7.

The device shown in FIG. 2 is composed of a body which includes a chamber 16 closed at the top with a transparent portion including a frontal area 11 in the form of a glass or quartz spherical chamber within which further elements are placed, where moving inward from the front side 11 of the chamber 16, first, there is a vacuum chamber 12 in which an optically active element 19, and then a pedestal 18, a spacer 13, a focusing lens 14, an IR diode 15 connected to a laser diode electrical power supply unit 17.

The device shown in FIG. 3 is composed of a body which includes a chamber 26 closed at the top with a transparent portion including a frontal area 21 in the form of a glass or quartz spherical chamber within which further elements are placed, where from the front side 21 of the chamber 26, first, there is a vacuum chamber 22 comprising an optically active element 28, and then a mirror 29, a spacer 23, a focusing lens 24, an IR diode 25 connected to a diode power unit 27.

In an exemplary embodiment, independently from whether the source of white light is to emit a beam of white light point wise or it is to be scattered, the frontal area of the upper end of the chamber may be flat or convex. To further strengthen the emission intensity of a beam of white light generated by an exemplary embodiment, between the vacuum chamber comprising the optically active element and the spacer, a pedestal with a low thermal conductivity or a dielectric mirror reflecting radiation from the VIS range, transparent to IR radiation, can be placed.

Due to its characteristics distinguished by low power consumption (energy savings) as well as spectral characteristics (broadband emission covering the entire range of visible radiation), an exemplary embodiment may replace the currently used fluorescent tubes, LEDs, etc., used currently in the lighting industry.

Comparison of energy consumption of the currently used types of lighting is presented in the table below:

| Parameters | Exemplary Embodiment | LEDs | Fluorescent tubes | Traditional light bulb |
|---|---|---|---|---|
| Expected lifetime of bulb | 10,000 | 50,000 | 10,000 | 1,200 |
| Amount of watts (equivalent to 60-watt traditional light bulb) | 2 | 10 | 14 | 60 |
| Average cost of bulb (PLN) | 217 | 111 | 15 | 5 |
| Amount of energy in KWhs consumed during 50,000 hours of operation of bulb | 100 | 500 | 700 | 3,000 |
| Cost of electricity (approx. PLN 0.628 per KWh) | 63 | 314 | 440 | 1,884 |
| Required number of bulbs per 50,000 hours of operation | 5 | 1 | 5 | 42 |
| Cost of bulbs for 50,000 hours of operation | 1,085 | 111 | 61 | 163 |
| Total cost for 50,000 hours of operation | 1,148 | 425 | 501 | 2,047 |

EXAMPLES

Exemplary embodiments utilizing the principals described herein are further illustrated by the following examples, which are set forth to illustrate the presently disclosed subject matter and are not to be construed as limiting.

Example 1

In a glass chamber, closed at the top with a transparent flat frontal area, an optically active element in the form of a layer of nanocrystalline $NaYbF_4$ powder with a thickness of up to 2 mm was placed. Pressure in a vacuum chamber is below $10^3$ mbar.

Upon excitation of a matrix by a laser diode elements emitting a 980 nm laser beam, white light of warm colour was obtained.

Example 2

In a glass chamber, closed at the top with a transparent flat frontal area, an optically active element in the form of a layer of nanocrystalline $NaNdF_4$ powder with a thickness of 1 mm was placed. Pressure in a vacuum chamber is below $10^{-3}$ mbar.

Upon excitation of a matrix by a laser diode elements emitting a 980 nm laser beam, white light of warm colour was obtained.

Example 3

In a glass chamber, closed at the top with a transparent flat frontal area, an optically active element in the form of a layer of nanoceramics $LiLaF_4$ with a thickness of 2 mm, doped with 75 at % of $Nd^{3+}$ ions, was placed. The distance between a lens and the optically active element is 3 mm, and the pressure in a vacuum chamber is 10 mbar.

Upon excitation of a matrix by a laser diode elements emitting a 980 nm laser beam, white light of warm colour and CRI of 94 was obtained.

Example 4

In a glass chamber, closed at the top with a transparent flat frontal area in the form of a quartz spherical chamber, on a dielectric mirror, an optically active element in the form of a layer of $Ca_9Nd(OH)_2$ crystal with a thickness of 5 mm was placed. The distance between a lens and the optically active element is 7 mm, and the pressure in a vacuum chamber is $10^{-1}$ mbar. Upon excitation of a matrix by a laser diode elements emitting a 808 nm laser beam, white light of warm colour and CRI of 87 was obtained.

Example 5

In a glass chamber, closed at the top with a transparent flat frontal area in the form of a quartz spherical chamber, on a dielectric mirror, an optically active element in the form of a layer of $Ca_9La(OH)_2$ crystal with a thickness of 5 mm, doped with 35 at % of $Yb^{3+}$ ions, was placed. The distance between a lens and the optically active element is 4 mm, and the pressure in a vacuum chamber is $10^2$ mbar.

Upon excitation of a matrix by a laser diode elements emitting a 808 nm laser beam, white light of warm colour and CRI of 94 was obtained.

Example 6

In a glass chamber, closed at the top with a transparent flat frontal area in the form of a quartz spherical chamber, on a dielectric mirror, an optically active element in the form of a layer of $NaLaP_4O_{12}$ crystal with a thickness of 5 mm, doped with 5 at % of $Nd^{3+}$ ions, was placed. The distance between a lens and the optically active element is 2 mm, and the pressure in a vacuum chamber is $10^{-6}$ mbar. Upon excitation of a matrix by a laser diode elements emitting a 808 nm laser beam, white light of warm colour and CRI of 92 was obtained.

Example 7

In a glass chamber, closed at the top with a transparent flat frontal area in the form of a quartz spherical chamber, on a dielectric mirror, an optically active element in the form of a layer of $RbNdP_4O_{12}$ crystal with a thickness of 5 nm was placed. The distance between a lens and the optically active element is 10 mm, and the pressure in a vacuum chamber is $10^{-4}$ mbar. Upon excitation of a matrix by a laser diode elements emitting a 808 nm laser beam, white light of warm colour and CRI of 85 was obtained.

Example 8

In a glass chamber, closed at the top with a transparent flat frontal area in the form of a quartz spherical chamber, on a dielectric mirror, an optically active element in the form of a layer of $KLaP_4O_{12}$ crystal with a thickness of 50 nm, doped with 80 at % of $Nd^{3+}$ ions, was placed. The distance between a lens and the optically active element is 7 mm, and the pressure in a vacuum chamber is $10^{-3}$ mbar. Upon excitation of a matrix by a laser diode elements emitting a 808 nm laser beam, white light of warm colour and CRI of 87 was obtained.

Example 9

In a glass chamber, closed at the top with a transparent flat frontal area in the form of a quartz spherical chamber, on a dielectric mirror, an optically active element in the form of a layer of $NaYbP_4O_{12}$ crystal with a thickness of 5 mm was placed. The distance between a lens and the optically active element is 4 mm, and the pressure in a vacuum chamber is $10^{-3}$ mbar. Upon excitation of a matrix by a laser diode elements emitting a 975 nm laser beam, white light of warm colour and CRI of 95 was obtained.

Example 10

In a glass chamber, closed at the top with a transparent flat frontal area in the form of a quartz spherical chamber, on a dielectric mirror, an optically active element in the form of a layer of $RbYP_4O_{12}$ crystal with a thickness of 250 nm, doped with 50 at % of $Yb^{3+}$ ions, was placed. The distance between a lens and the optically active element is 3 mm, and the pressure in a vacuum chamber is $10^{-3}$ mbar. Upon excitation of a matrix by a laser diode elements emitting a 980 nm laser beam, white light of warm colour and CRI of 92 was obtained.

Of course these described embodiments are exemplary and alterations thereto are possible by those having skill in the relevant technology.

Thus the example embodiments and arrangements achieve improved capabilities, eliminate difficulties encountered in the use of prior articles and methods, and attain the desirable results described herein.

In the foregoing description, certain terms have been used for brevity, clarity and understanding. However, no unnecessary limitations are to be implied therefrom because such terms are used for descriptive purposes and are intended to be broadly construed.

Moreover the descriptions and illustrations herein are by way of examples and the inventions not limited to the features shown and described.

Further, it should be understood that components, materials, features and/or relationships associated with one embodiment can be combined with components, materials, features and/or relationships from other embodiments. That is, various components, materials, features and/or relationships from various embodiments can be combined in further embodiments. The inventive scope of the disclosure is not limited to only the embodiments shown or described herein.

Having described the features, discoveries and principles of the exemplary embodiments, the manner in which they are made, utilized and carried out, and the advantages and useful results attained, the new and useful articles, arrangements, combinations, methodologies, structures, devices, elements, combinations, operations, processes and relationships are set forth in the appended claims.

The invention claimed is:

1. An article of manufacture comprising:
   at least one white light emitting device,
     wherein the at least one white light emitting device includes,
       a transparent glass or quartz portion,
       a vacuum chamber,
         wherein the vacuum chamber comprises,
           an optically active element,
             wherein the optically active element includes a thin-layer oxide matrix doped with rare earth ions including at least one of Nd and Yb,
             wherein a concentration of dopant ions is in a range of 0.0001 to 100%,
           a focusing lens,
           a spacer, wherein the spacer separates the focusing lens from the optically active element by a distance, and
an IR laser diode,
where the IR laser diode is operative to output radiation that contacts the optically active element responsive to electrical power delivered from a power supply unit,
wherein the radiation contacting the optically active element causes white light to be generated and to pass through the transparent portion.

2. The article of manufacture of claim 1,
wherein the thin-layer oxide matrix is selected from a group comprising:
$Ca_9Nd(OH)_2$, $Ca_9Yb(OH)_2$, $NaNdP_4O_{12}$, $RbNdP_4O_{12}$, $RbYbP_4O_{12}$, $Y_{2(1-x)}Yb_{2x}O_3$ if $x>0.3$, $Y_{3(1-x)}Nd_{3x}Al_5O_{12}$ if x from 0.3 to 1, $Y_{2(1-x)}Nd_{2x}O_3$ if x from 0.3 to 1.

3. The article of manufacture of claim 1,
wherein the optically active element is positioned within in the vacuum chamber, and
wherein the optically active element includes a thin-layer oxide matrix in a form of nanocrystalline or microcrystalline powder, glass, crystal, nanoceramics, nanocomposite,
wherein the thin-layer oxide matrix has a thickness not greater than 10 mm.

4. The article of manufacture of claim 1,
wherein the optically active element, upon excitation with a radiation beam generated by the IR laser diode, emits white light of CRI above 90.

5. The article of manufacture of claim 1,
wherein the IR laser diode is operative to generate radiation having a wavelength in a range of 800-1200 nm.

6. The article of manufacture of claim 1,
wherein the vacuum chamber including the optically active element is pressurized at a pressure value,
wherein the pressure value is set in a range of $10^3$-$10^{-6}$ mbar.

7. The article of manufacture of claim 1,
wherein a light intensity output is variable with each of
a pressure level in the vacuum chamber, and
the distance the spacer separates the optically active element and the focusing lens.

8. An article of manufacture comprising:
a body,
wherein the body is in operative connection with a transparent portion,
a vacuum chamber within the body,
an optically active element,
wherein the optically active element
extends in the vacuum chamber,
includes a thin-layer oxide matrix doped with rare earth ions including at least one of Nd or Yb,
wherein a concentration of dopant ions is in a range of 0.0001 to 100%
an IR laser diode,
wherein the IR laser diode is in operative connection with the body,
is operative to output radiation in response to electrical power supplied thereto,
wherein the IR laser diode is operative to output IR radiation that contacts the optically active element,
wherein the optically active element responsive to the IR radiation is operative to output light that passes from the body through the transparent portion.

9. The article of manufacture of claim 8,
wherein the thin-layer oxide matrix is selected from a group comprising:
$Ca_9Nd(OH)_2$, $Ca_9Yb(OH)_2$, $NaNdP_4O_{12}$, $RbNdP_4O_{12}$, $RbYbP_4O_{12}$, $Y_{2(1-x)}Yb_{2x}O_3$ if $x>0.3$, $Y_{3(1-x)}Nd_{3x}Al_5O_{12}$ if x from 0.3 to 1, $Y_{2(1-x)}Nd_{2x}O_3$ if x from 0.3 to 1.

10. The article of manufacture of claim 8,
wherein the optically active element includes a thin-layer oxide matrix in a form of nanocrystalline or microcrystalline powder, glass, crystal, nanoceramics, nanocomposite,
wherein the thin-layer oxide matrix has a thickness not greater than 10 mm.

11. The article of manufacture according to claim 8,
and further including a lens,
wherein the lens is in operative connection with the body,
wherein the lens is operative to direct radiation from the IR laser diode to the optically active element.

12. The article of manufacture of claim 8,
wherein the optically active element, upon excitation with a radiation beam generated by the IR laser diode, emits white light of CRI above 90.

13. The article of manufacture of claim 8,
wherein the IR laser diode is operative to generate radiation having a wavelength in a range of 800-1200 nm.

14. The article of manufacture of claim 8,
wherein the vacuum chamber is pressurized at a pressure value, in a range of $10^3$-$10^{-6}$ mbar.

15. The article of manufacture according to claim 8,
wherein an output light intensity from the transparent portion is variable with a pressure value in the vacuum chamber.

16. The article of manufacture according to claim 8, and further comprising,
a pedestal, wherein the pedestal is positioned on an opposed side of the transparent portion from the optically active element.

17. The article of manufacture according to claim 8, and further comprising,
a mirror,
wherein the mirror is positioned on an opposed side of the transparent portion from the optically active element,
wherein the mirror includes a dielectric mirror operative to reflect radiation from a VIS range and transmit IR radiation.

* * * * *